July 6, 1926.

H. C. DICKINSON

VIBRATION ANALYZER

Filed March 29, 1923    3 Sheets-Sheet 1

Inventor
Hobert C. Dickinson,
By Robert A. Young.
Attorney

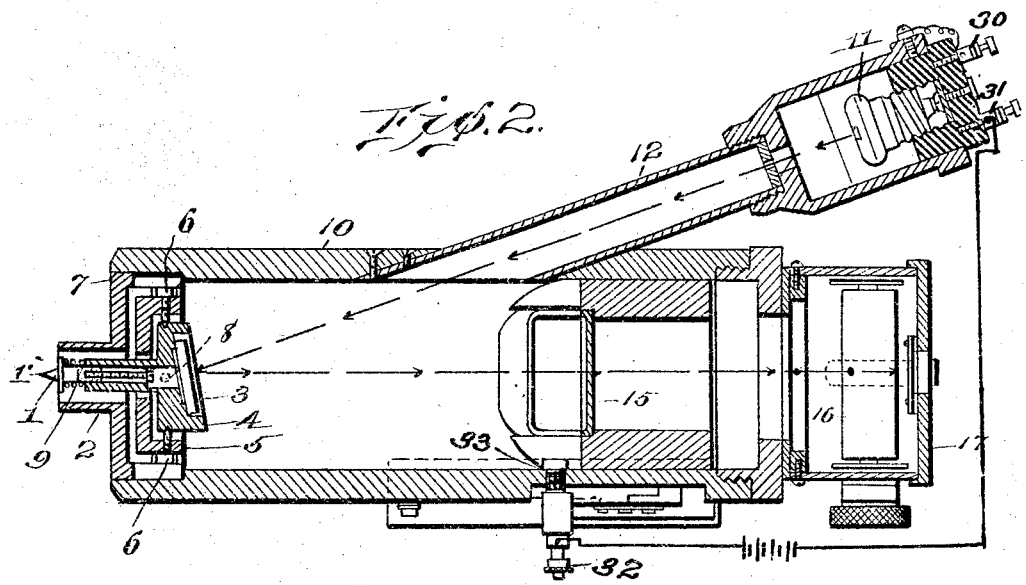
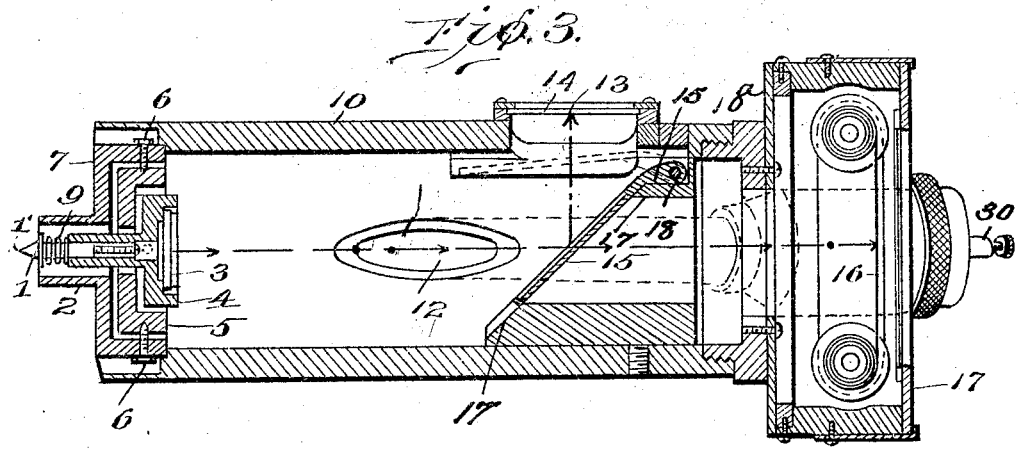

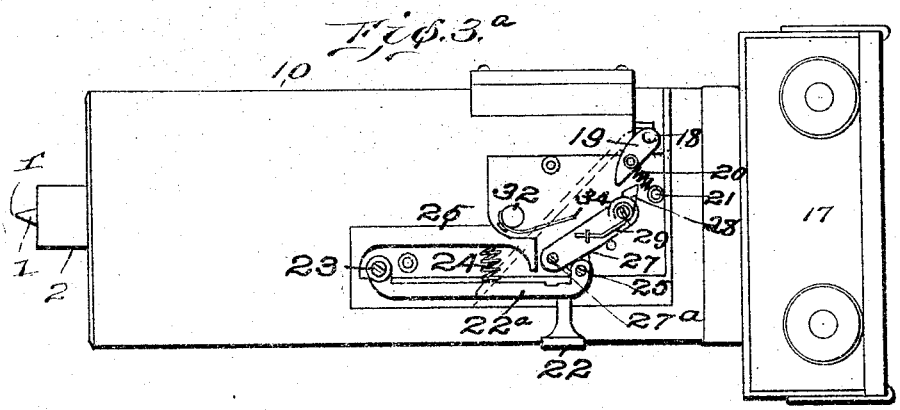
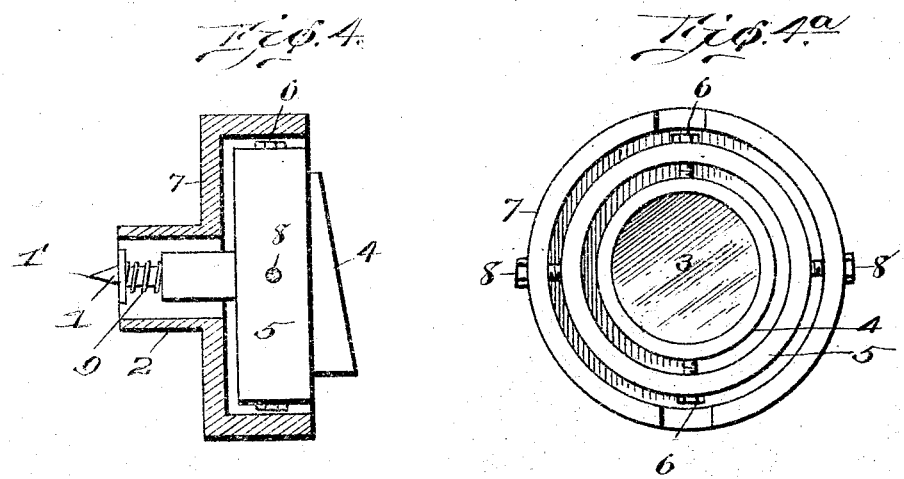

Patented July 6, 1926.

1,591,612

UNITED STATES PATENT OFFICE.

HOBERT C. DICKINSON, OF WASHINGTON, DISTRICT OF COLUMBIA.

VIBRATION ANALYZER.

Application filed March 29, 1923. Serial No. 628,653.

This invention relates to vibration analyzers and especially to such in which an indication is set up, optically, photographically or otherwise, of the type of vibration occurring in and/or about a definite object.

As one of the particular objects of the invention, use is made of the natural flexibility and inertia of the observer's body to replace the seismographic mass hitherto employed when there is no available fixed point to which the motions can be referred. The method characteristic of the present invention, therefore, is particularly valuable where portability and quick adaptability for motional investigations is of prime importance. By means of the instrumentalities disclosed herewith, it is, therefore, possible, to make simple and quick qualitative analyses of the so-called critical vibrations of machinery, etc. Moreover, by observing the amplitudinal indications in vibrations of relatively high frequency a useful quantitative analysis can also be obtained.

It should be remarked that as a preferred feature of the invention the indications of the instrument described herewith are so coordinated that the qualitative motional resultant is reduced to two or even a one dimensional case. Thus, by applying the instrument to an object, at different angles, it becomes possible to eliminate one or more directional components to the end that an analytical rather than a composite record is established.

To achieve the latter result, applicant makes use of a gimbal support for a light element in an optical system, such that, substantially no motion is transmitted from the vibrating object investigated in a line perpendicular to a reference plane passing through one or more axes of the gimbal supports. The effect of such an elimination is that manual application to the body investigated of the pointer attached to the light element is made possible by not introducing any error along the line of application to the interpretations of the instrument.

In order, better to enable others to profit by the said inventions, the following embodiment is described, in which:—

Figure 2 represents a plan part-sectional view of the instrument.

Figure 1:
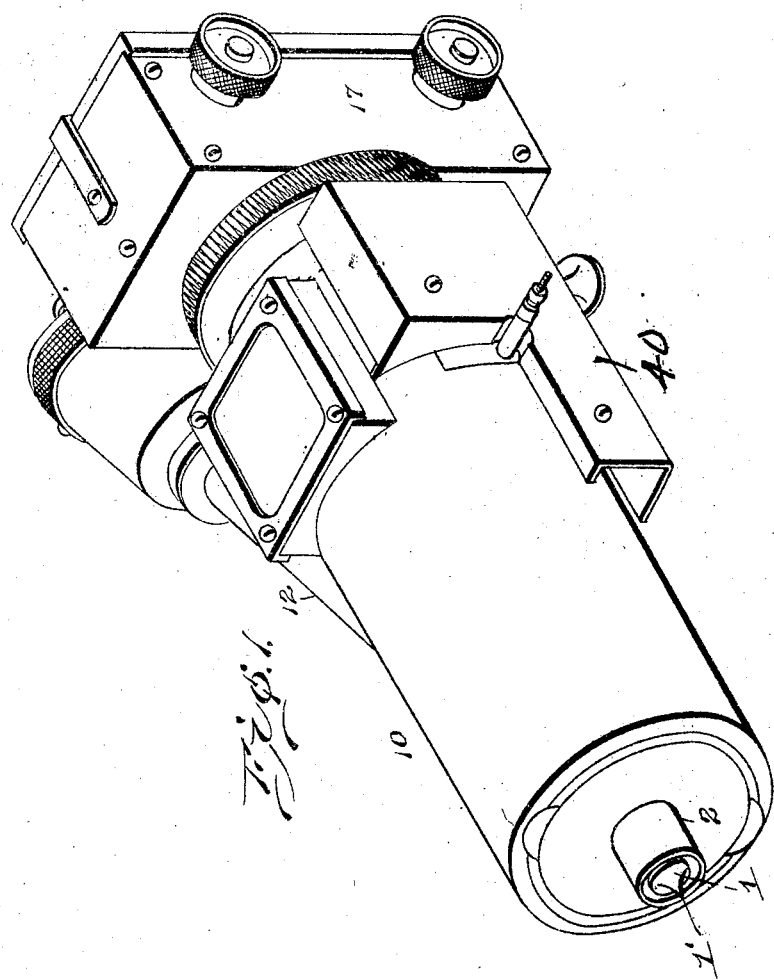
Figure 1 represents a perspective view of the analyzer.

Figure 3 corresponds to a vertical part-sectional view similar to Figure 2.

Figure 3$^a$ is a side elevation of my device with the cover of the shutter operating mechanism removed, the shutter being shown in dotted lines.

Figures 4 and 4$^a$ represent detail views of the gimbal support for the reflecting mirror employed in the optical system.

In operation a pointer 1 is employed for engagement with the object whose motions are to be analyzed. This pointer is, preferably, slidingly mounted within a tubular projection 2 integral with a reflecting mirror element 3 fixedly mounted in a mirror housing 4. The latter housing is revolubly mounted in a gimbal ring support 5 by means of pivots or the like 6, whereas the ring support 5, in turn, is pivotally supported in a relatively fixed mounting 7 by means of pivot supports 8.

Preferably between the pointer 1 and its associated tubular projection 2 is a compression spring 9, so arranged that the sharp point 1' of the pointer is capable of spring controlled axial movement with respect to the tube 2 when applying the point 1' to the surface of the body to be investigated. It will be readily seen, therefore, that any variation of the pressure manually applied to the pointer 1, through the housing support 10 of the mirror-gimbal structure 1—6 will not affect materially the extent of the angular motions transmitted to the pointer 1 by the vibrations of the body to which the pointer is applied provided such vibrations are substantially in the plane of the gimbal axes.

An important feature of the invention is the method of amplification made possible by the above reflecting mirror; for by means of a light source 11 mounted in a tube 12, integral with the housing 10, in the first place the angular motion of the reflected light beam is twice that of the angular motion of the pointer 1 and secondly the linear travel of the light spot produced by the reflected beam is amplified in proportion to the ratio of the distance of the point 1' with respect to the mirror 3 and the distance of the light spot 13 from the mirror 3 as measured by the length of path of the beam from the light spot to the reflecting surface of the mirror. The two elements of amplifications are in multiplying relation.

Naturally with such an instrument at hand, all one has to do is press the pointer against the desired part of the mechanism and the elements of vibration will make themselves manifest as a light spot upon either the ground glass 14 by virtue of a reflecting mirror 15 in the path of the reflected ray, or upon a photographic film 16 arranged within any suitable type of camera box 17. When the mirror 15 is in the position shown in full lines in Figure 3, the lights rays will be reflected to the ground glass 14 and the observations will be made visually. I will now describe my apparatus whereby the mirror can be moved into the position shown in the dotted lines in order that the effect of the vibration upon the reflected beam of light may be recorded photographically.

A gland 10ª is fitted into the body 10 of my device and is provided with two beveled faces 17 against which the mirror 15 normally rests, the mirror being pivotally connected to the body by means of a pin 18 to which it is fixedly secured. A lever 19 is also fixedly secured to the pin 18 and is normally held in position shown in Figure 3ª by means of a tension spring 20, one end of which is secured to the body 21. Extending along the side of the body 10 is a push button 22 which is fixed to a lever 22ª pivoted to the body of 23 and normally maintained in a position shown in Figure 3 by a compression spring 24, the other end of which bears against the member 25. The lever 22ª is pivotally connected at 26 to a lever arm 27 pivoted at 27ª to the body. A dog 28 is pivotally secured to the lever 27 adjacent to upper end and is normally held in the position shown in Figure 3ª by a coil spring 29.

It will be seen that by pressing upwardly on the push button 22, the lever 22ª will raise the lever 27 causing its dog 28 to engage with the lever 29 and raise the mirror about its pivot 18. This motion will continue until the dog 28 slips past the end of the lever 19 when the mirror will be returned to the position shown in Figure 3ª under the influence of the spring 20.

The source of light 11 is usually of a normally low voltage and is obtained from any suitable source of current such as a battery or the like, through the means of the terminals 31 and 32, terminal 30 being grounded to the body of the device. At 33 I have shown a resistance coil introduced in this circuit to decrease the voltage going through the light 11. It will be noted that when the lever 27 is moved upwardly one end of the spring 29 will contact with a contact member 34 secured to the binding post 32 before the mirror is acutally lifted. This short circuits the resistance coil and consequently increases the voltage passing through the lamp to cause a light of sufficient intensity for the purpose of making a photograph. This increased intensity of light, which is more than the lamp is normally designed to bear for any prolonged interval, lasts only until the dog 28 slips past the lever 19 when the structure is returned to its normal position. The mirror thus acts as a shutter, the time of opening of which can be controlled entirely by the speed with which the push button 22 is moved inwardly. The vibration can be visualized in the ground glass until the actual moment when the photograph is to be taken.

A cover 40 for the shutter operating mechanism as shown in Figure 1 may be provided. The type of camera box employed depends naturally upon the type of photographic record it is desired to obtain. Momentary (snap shot) exposures of the graflex type can be taken or the film can be drawn uniformly as against being intermittently drawn, across the path of the light ray when obstructed by the mirror 15 acting as an intermittent shutter or otherwise. Naturally, if the pointer, because of the object against which it is pressed goes through an elliptical type of motion the more appropriate type of camera is that where the shutter mechanism is of the more rapidly intermittent type though it should also be remembered that by suitably observing the light source before reflection a motion picture record as it were, can be obtained if desired.

Having described the nature of my invention what I claim is:—

1. A method of analyzing the vibrational motions occurring in a mechanism comprising the step of eliminating the motional component along a predetermined vector line passing through a given point of the mechanism, determining the type of the remaining motion set up, then changing the direction line of the vector passing through the same point and repeating the determination of motional type.

2. A method according to claim 1 comprising the further step of determining the cyclical sequence of the vibrational motions analyzed.

3. A vibration analyzer comprising a pin device for contacting with a vibrating object mounted on gimbals, a casing for said gimbal mounting, and a means on said casing for indicating the type of motion of said pin device with respect to said gimbal mounting.

4. A vibration analyzer comprising a pin device for contacting with a vibrating object mounted on gimbals, a casing for said gimbal mounting and an optical reflecting means in said casing for indicating the type of motion of said pin device with respect to said gimbal mounting.

5. A vibration analyzer comprising a pin device for contacting with a vibrating object adapted to be pressed against a mechanism whose motions are to be determined, a gimbal mounting for said pin device, a casing for said gimbal mounting and a motion amplifying means for said pin device.

6. A virbration analyzer comprising a pin device for contacting with a vibrating object adapted to be pressed against a mechanism whose motions are to be determined, a gimbal mounting for said pin device, a casing for said gimbal mounting and a light reflecting motion amplifying means for said pin device.

7. A motion analyzer comprising a reflecting mirror means connected to a pin device for contacting with a vibrating object, a universal gimbal mounting for said mirror means, said mirror means adapted to be motionally disturbed by the vibrations of the mechanism to be investigated.

8. A method of analyzing vibrational motions of a mechanism comprising the step of attaching a light reflecting device to said mechanism to make said reflecting device partake of the motions of said mechanism, directing at least two light pencils or rays at different angles with respect to each other, toward said reflecting device and recording the different traces of such reflected pencils or rays.

9. In combination with a light reflecting means connected to a pin device for contacting with a vibrating body, a supporting means, for giving to said first named means a motional freedom with respect to said supporting means to accord with the gyrations of a body to be investigated.

10. In combination with a light reflecting means connected to a pin device for contacting with a vibrating body, a manually arranged means for giving to said first named means a motional freedom with respect to said manually arranged means to accord with the gyrations of a body to be investigated.

11. In combination with a light reflecting means, a manually arranged means for giving to said first named means a motional freedom with respect to said manually arranged means to accord with the gyrations of a body to be investigated, said light reflecting means comprising a flexibly arranged contacting means for contacting with the vibrating body to be investigated giving a substantial freedom from reflectional disturbance caused by the motion of said contacting means with respect to said manually arranged supporting means.

12. In combination with a light reflecting means having a device adapted to contact with the vibrating body to be investigated, a supporting means for giving to said first named means a motional freedom with respect to said supporting means to accord with the gyrations of the said body and further means, optionally, to give a visible light trace of the reflected ray or photographically to record the trace of said reflected ray.

13. A method of analyzing the motional vibrations set up at a point within a body comprising the step of first determining the actual motion in the direction of a line passing through a given point on the surface of the body to be investigated and directed toward the point within the body, then changing the position of the point first mentioned and subsequently determining the actual motion along a line through the second point on the surface and directed toward the point in body required to be analyzed, and further repeating the change in position of the surface point with a view to determining the motion along three lines forming a solid angle with the point within the body as vertex.

14. A method of analyzing the vibrational motions at a point within a body comprising the step of determining the componetal motions of the body in three planes at right angles respectively to three lines forming a solid angle with the point within the body as vertex.

15. In combination with a light reflecting means having secured thereto a device for contacting with a vibrating body, a supporting means for giving to the first named means a motional freedom with respect to the supporting means to accord with the gyrations of the said vibrating body, a source of light within said body, a mirror adapted to reflect light from said light reflecting means to an observation plate, and means for moving said mirror towards said plate out of the path of the light from the light reflecting means, and means for photographically recording the trace of said reflected ray.

16. In combination with a light reflecting means having secured thereto a device for contacting with a vibrating body, a supporting means for giving to the first named means a motional freedom with respect to the supporting means to accord with the gyrations of the said vibrating body, a source of light within said body, a mirror adapted to reflect light from said light reflecting means to an observation plate, and means for progressively increasing the intensity of said source of light and moving the mirror towards said plate out of the path of the light from the light reflecting means, and means for photographically recording the trace of said reflected ray.

In testimony whereof I affix my signature.

HOBERT C. DICKINSON.